Sept. 24, 1968 M. R. HUTCHISON, JR 3,402,638
AUTOMATIC FILM FOCUSING BY PNEUMATIC SERVOMECHANISM
Filed Dec. 5, 1966
2 Sheets-Sheet 1

MILLER R. HUTCHISON, JR.
INVENTOR

BY
ATTORNEYS

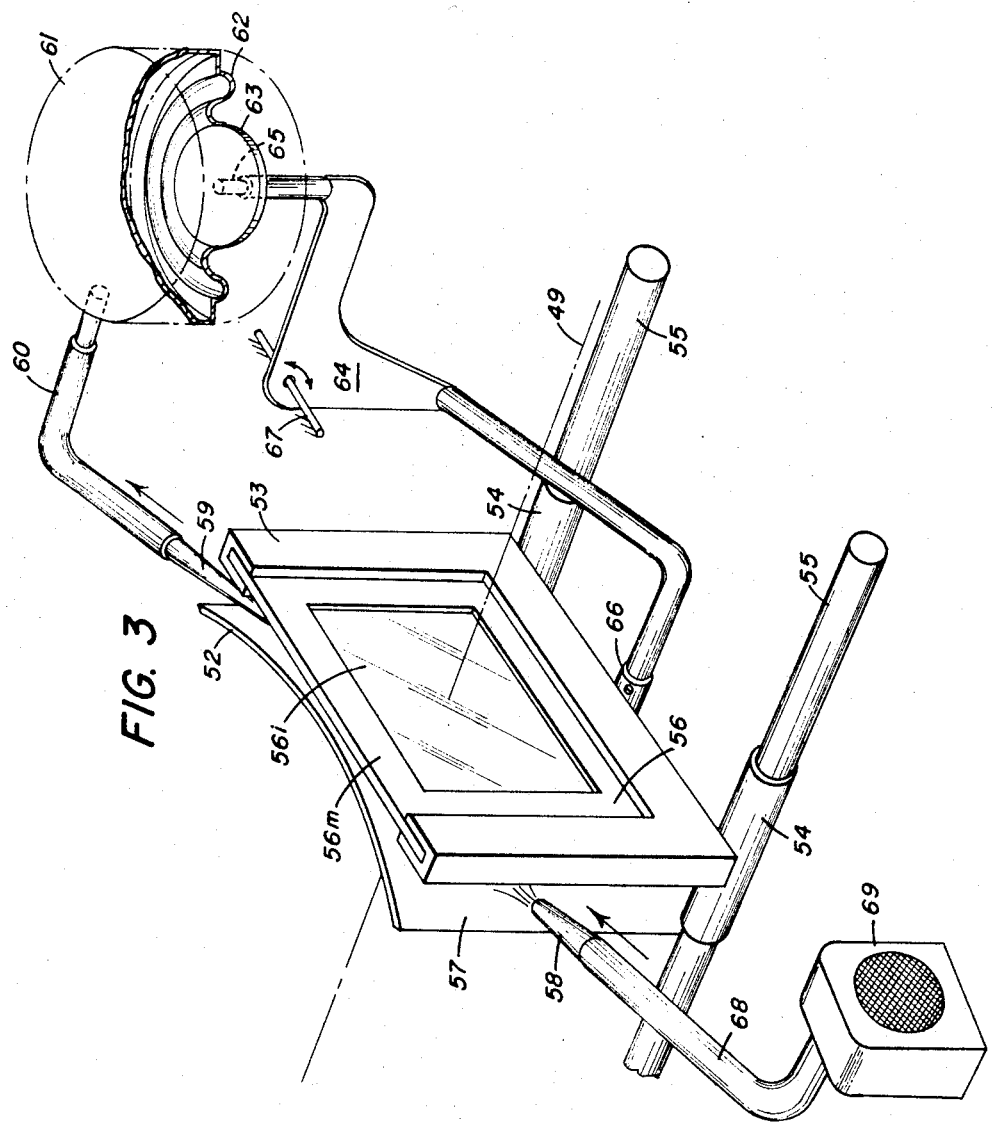

United States Patent Office 3,402,638
Patented Sept. 24, 1968

3,402,638
AUTOMATIC FILM FOCUSING BY PNEUMATIC SERVOMECHANISM
Miller R. Hutchison, Jr., Rochester, N.Y., assignor to Eastman Kodak Company, Rochester, N.Y., a corporation of New Jersey
Filed Dec. 5, 1966, Ser. No. 599,238
6 Claims. (Cl. 88—26)

This invention relates to photographic projection apparatus and, more particularly, to a method and means for automatically maintaining image focus in a slide projector.

One of the major problems in film projection is the loss of sharp image focus during projection due to heat distortion or "popping" of the film. Since the information area of each film record has a unique point-to-point variation in density, its absorption of the intense projector radiation similarly varies from point-to-point, resulting in a unique distortion pattern for each projected film record. Also, in slide projection, variations in the dimensions and linearity of the peripheral mounting area of each slide results in slightly different positions, relative to the projection lens, of the film surface of each successive slide fed into the projector.

In well-known prior art apparatus directed to this problem, changes in film position during projection are detected by reflecting a narrow light beam from a small area of the film surface at near grazing incidence. A change in the position of this small surface area causes a deflection of the reflected light beam which is sensed by light-sensitive cells; and, by means of appropriate circuitry, mechanism is actuated to readjust the film plane itself or to shift the inner focal plane of the projection lens to compensate for the shift in the film plane.

A more recent solution of the "loss of sharp focus" problem is the automatic focusing method and means described in U.S. application Ser. No. 432,695 filed Feb. 15, 1965, by White, and assigned to the present assignee. The system disclosed in the White application involves directing a stream of air or other fluid through a restricted channel defined by the film and a reference surface, detecting any change in the pressure resulting from changes in the position of the film relative to the reference surface, and then adjusting the projector's focusing means in accordance with such changes in pressure. Although White's monitoring means departs radically from other prior art, it can be used with various focus adjusting systems and, preferably, with one which moves the film slide rather than the lens.

The present invention employs the general concept set forth in said White application, namely, the directing of a stream of fluid through a channel formed by the film slide and a reference surface and detecting changes in pressure resulting from changes in position of the film relative to the reference surface. However, in the present invention the focus adjusting system is greatly improved and simplified by effectively eliminating the necessity for complex focus adjusting means, namely, by moving the film in direct response to changes in the pressure of the stream. This is accomplished by pneumatic servomechanism structure which senses changes in pressure in the channel and acts directly upon the film slide to cause movement of the slide in a direction to maintain sharp focus.

In a preferred embodiment of the invention, the channel defined by the reference surface and the film forms a venturi passage across the rear face of the film, while an airtight chamber, having one of its walls formed by the film slide itself, is immediately adjacent the front face of the film. An effective servomechanism is created by a small tube interconnecting the otherwise airtight chamber with the throat of the venturi to equalize the pressure in the chamber with the pressure appearing in the throat. Since the pressure at the throat is the lowest pressure in the channel across the rear face of the film, the average pressure acting on the rear of the film always exceeds that in the chamber in front of the film. Thus a differential pressure is created, always urging the film towards the chamber. This differential pressure is offset by a resilient gasket means which effects the pneumatic sealing of the forward chamber and also urges the film rearwardly with a predetermined force. At equilibrium (the "in focus" position), the differential pressure equals the offsetting resilient force so that the film is held stationary in its "in focus" position.

In the event of changes in the position of the film relative to the curved reference surface, e.g., due to "popping" under the intense radiation of the projection lamp, the width of the venuri throat is altered, thereby changing the pressure delivered to the airtight chamber. This alters the differential pressure holding the film and, since the force exerted by the resilient means is (for all practical purposes) relatively constant, the equilibrium state is unbalanced. This unbalance causes the film to be moved away from, or toward, the reference surface in accordance with the nature of the pressure change, to return the film to its equilibrium, or "in focus," position.

As different from prior art systems which sense the effects of distortion in only a small area of the slide, in the preferred embodiment the venturi is rectangular and forms its narrowed throat along a transverse centerline running the full vertical dimension of the projected film area. The automatic focus adjustment therefore is based upon an average of the distortion present across this entire centerline dimension.

In another embodiment of the invention, pressure changes in the venturi throat are monitored by a pneumatic cylinder either upstream or downstream from the channel, and a direct mechanical connection is provided between the resilient pneumatic cylinder and the film supporting means. In this manner, changes in pressure across the channel cause direct actuation of a pneumatic-mechanical film positioning means to maintain the film at its equilibrium, or "in focus" position. Although the invention is described in terms of slide projection, it is also applicable to other types of projection apparatus such as microfilm projectors, photoenlargers, etc.

It is an object of this invention to provide apparatus for automatically correcting changes in focus occurring during film projection due to heat distortion or to the differing positions, relative to the lens, of successive slides placed in the projector, wherein a highly efficient and quick-acting adjustment of the relative positions of slide and projection lens is accomplished in an economical manner.

Another object is to provide a novel pneumatic servomechanism for maintaining focus in a slide projector.

Still another object of the invention is to provide a novel and extremely simple method for maintaining proper image focus in projection apparatus.

The above and other objects and features of the invention herein will be apparent from the following specification taken in conjunction with the attached drawings in which:

FIG. 3 is a perspective schematic view of a second embodiment of the invention.

Figure 1:
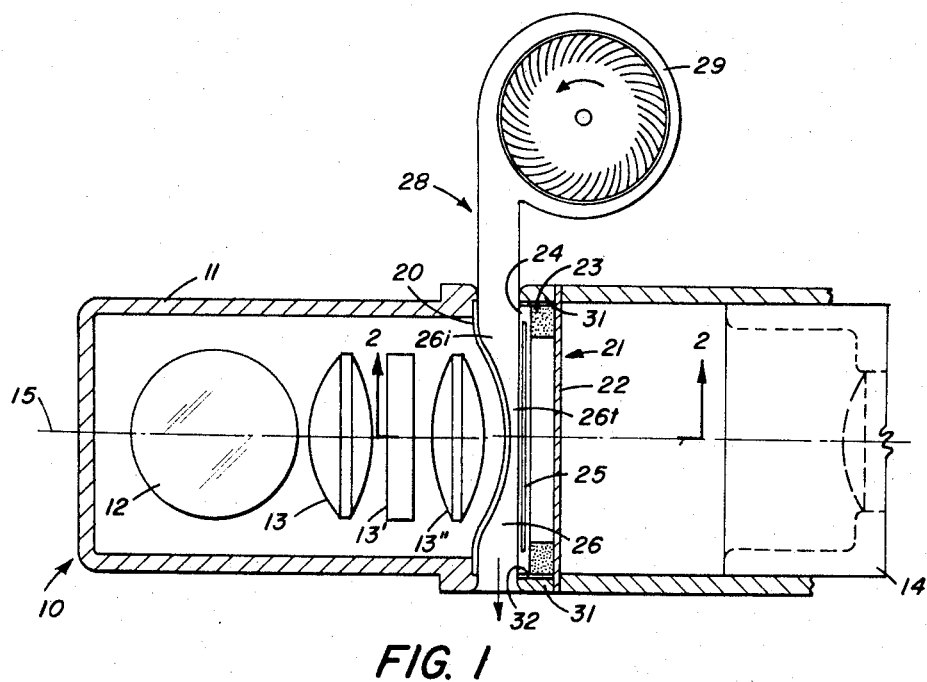
FIG. 1 is a plan schematic view of a slide projector showing the essential elements of the invention.
Figure 2:
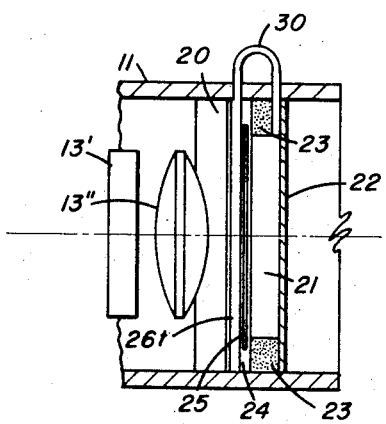
FIG. 2 is a partial sectional view taken along line 2—2 of FIG. 1.

Referring to FIGS. 1 and 2 there is shown a portion of a projector 10 having a projection axis 15. A projector housing 11 contains a light source 12 at the rear end of the projector and a series of condenser lenses 13, 13' and 13". Mounted at the front end of the projector is the projection lens assembly 14. Between the condenser lenses and the projection lens assembly there is mounted the automatic focusing apparatus of the present invention.

A curved transparent reference surface 20 (which may be part of a weak negative cylindrical lens used to improve the performance of the condenser lens system) is mounted in housing 11 on the projection axis forward of the condenser lens assembly. Reference surface 20 is convex towards the front of the projector and is in the shape of a cylinder segment, the axis of the cylinder passing vertically through and perpendicular to the projection axis. Immediately forward of reference surface 20 is a film gate 24, adapted to support film such as slide 25.

An airtight chamber 21 is formed adjacent the front surface of the film, that is, on the side away from curved reference surface 20. Chamber 21 comprises a fixed plane transparent cover glass 22 mounted on the projection axis and having affixed to the rear face thereof a resilient, compressible gasket member 23. Slide 25 is positioned in film gate 24 so that its control, information bearing area is aligned with optical axis 15, while its peripheral mounting area contacts the rear side of gasket 23.

Positioned in the manner just described, the surface of slide 25 and curved reference surface 20 together form a channel 26, opened at the sides (see FIG. 1) and closed by housing 11 at the top and bottom thereof (see FIG. 2). The channel is enlarged at its inlet end 26i and at its exit end 26x, and restricted at its center 26t. Thus the shape of the channel is that of a rectangular venturi having a narrowed throat along a transverse centerline of the information area of slide 25.

A stream of air or other fluid at uniform pressure is directed through channel 26 by a blower 29 and conduit 28, and a tube 30 (see FIG. 2) connects the interior of chamber 21 with the throat 26t of the venturi passage.

In addition to the automatic focusing structure herein described, the projection apparatus also includes conventional manual focusing apparatus (not shown) for initially focusing the slide upon a projection screen at some preselected distance from the projector. After the apparatus has been initially focused by the manual focusing means, the novel control apparatus shown in FIGS. 1 and 2 maintains the focus automatically as follows:

Slide 25 is positioned in film gate 24 for viewing, and, in such position, closes off chamber 21. Blower 29 is then turned on to direct a stream of air, or other fluid, through conduit 28 and channel 26. The manual focusing means is then adjusted, if necessary, to focus at some remote point an image of the information area of slide 25.

Channel 26, as has been described above, forms a venturi passage, and, as is well known, the pressure resulting from the flow of air through a venturi bears an inverse relationship to the air velocity at each point along its length. Thus, the greatest velocity and smallest pressure are present at the throat of the venturi 26t, while the smallest velocity and highest pressure is present at the enlarged inlet 26i and exit 26x of the venturi passage. Since connecting tube 30 connects the chamber 21 to the venturi throat 26t, the pressure within the chamber 21 is uniform along the front surface of slide 25 and is always equal to the low pressure present at the throat 26t of the venturi. Therefore, since inlet 26i and exit 26x always experience greater pressure than that present at throat 26t and in chamber 21 (regardless of the average pressure in the channel), a pressure differential exists which holds slide 25 pneumatically against gasket 23. This differential force is balanced by the force of the partially compressed resilient gasket 23, and so, when the projector is initially focused, slide 25 may be characterized as being in an equilibrium, or "in focus," position.

If, due to the effect of the intense radiation from light source 12, slide 25 should distort so that its information bearing film surface moves toward the projection lens and "out of focus," it simultaneously moves away from reference surface 20 enlarging the width of the venturi and causing an increase in air pressure at throat 26t. This increase in pressure is transmitted to chamber 21. However, the mounting area of slide 25 remains relatively undistorted, and the pressure at inlet 26i and exit 26x of the channel 26 does not increase. Consequently, the differential pressure acting on slide 25 decreases and resilient gasket 23 urges slide 25 rearwardly, moving it back to its "in focus" position, at which position the force equilibrium is restored.

Conversely, if the film surface of slide 25 should "pop" rearwardly, the width of the venturi channel becomes smaller and the pressure at throat 26t, and thus the pressure within the chamber 21, is reduced, while the pressure at inlet 26i and exit 26x remains relatively constant. Accordingly, the differential pressure urging the film in a forward direction increases, further compressing resilient gasket 23 and urging the film forward towards its "in focus" position of force equilibrium.

Since these correction movements cause further changes in the width of the venturi channel, it is necessary that the dynamic system be damped to prevent oscillations. This damping is provided generally by gasket hysteresis and also can be controlled by air flow throttling in the connecting tube 30. The throttling means may be varied by fitting an adjustable restriction such as a needle valve (not shown) in the connecting tube 30.

A second embodiment of the invention is shown in FIG. 3. However, for purposes of clarity, only the essential elements of the automatic focusing adjustment means are shown, and it should be understood that the structure shown in FIG. 3 can be mounted in any conventional projector housing, such as that shown schematically in FIGS. 1 and 2.

Referring to FIG. 3, curved transparent reference surface 52 corresponds substantially to curved reference surface 20 in the embodiment of FIGS. 1 and 2. Immediately forward of reference surface 52 is a film gate 53 fixed to a pair of bearings 54 which are slidable on tracks 55. Slide 56, having an information bearing film area 56i and a peripheral mounting area 56m, is supported in film gate 53.

A channel 57 for air flow is provided between curved reference surface 52 and the surface of slide 56. The top and bottom of the channel may be closed off by the walls of the housing as in FIG. 1. Air at uniform pressure from a blower 69 passes through a tube 68, out of delivery nozzle 58, and through channel 57. At the opposite side of channel 57 the air passes into a receiving nozzle 59, through tube 60, and to a pneumatic servomechanism chamber 61. Airtight chamber 61 may be any type of closed resilient cylinder such as a bellows or a chamber having a diaphragm, and in the present embodiment, it comprises a rigid cylinder having one resilient diaphragm wall 62.

In a manner to be described in greater detail below, a change in the width of the channel 57 causes a change in the pressure of the fluid passing through the channel and thus alters the pressure of the fluid in chamber 61. This results in movement of resilient wall 62 which is attached to a rigid centrally located plate 63. A direct mechanical link 64 is provided between plate 63 and film gate 53. Mechanical link 64 is attached to plate 63 at a first end 65 and to film gate 53 at its other end 66, and it is constructed to rotate about a pivot point 67. Accordingly, when resilient wall 62 moves downwardly, indicating an increase in pressure in airtight cylinder 61, the mechanical link 64 urges film gate 53 rearwardly, and bearings 54 will slide rearwardly along tracks 55 so that film 56, film gate 53 and slide 56 move rearwardly towards reference surface 52. The converse is true when a reduction in pressure causes plate 63 to move up.

The second embodiment of the invention operates as follows: slide 56 is placed in film gate 53 and the air stream is directed through the channel 57. The initial equilibrium or "in focus" position is established by manually adjusting the position of the projector lens (not shown in FIG. 3) with respect to the film surface of slide 56. Nozzle 59 is placed near the throat of the venturi passage formed by the curved surface 52 and slide 56, so that the pressure within cylinder 61 represents the pressure at the narrow portion of the channel 57.

If the film area of the slide should distort forwardly, away from the curved surface, the width of the channel throat increases, as does the pressure in nozzle 59, tube 60, and cylinder 61, resulting in the downawrd movement of resilient diaphragm 62 and plate 63. This causes mechanical link 64 to rotate about pivot 67 and move film gate 53 rearwardly, returning the surface of slide 56 to its "infocus" position.

Conversely, if the film surface of slide 56 "pops" rearwardly, the pressure in nozzle 59, tube 60, and chamber 61 will decrease, resulting in the upward movement of plate 63, causing the link 64 to pull the film gate 53 forward to restore image focus.

Thus it can be seen that the present invention provides an automatic focusing adjustment means which is vastly simplified in comparison with previous automatic focusing means. In particular, the rather complicated optical, mechanical, electrical or electrical-mechanical transducer adjustment means has been eliminated.

It should be understood that the novel automatic focusing control means described herein is not to be limited to the two particular embodiments disclosed, but rather, that variations and modifications can be effected within the spirit of the invention as described hereinabove and as defined in the appended claims.

I claim:
1. In a photographic apparatus for receiving film having at least one information area with a corresponding peripheral non-information area and for projecting an image thereof, said apparatus including:
   (a) means for supporting said film;
   (b) lens means in adjustable spaced relation to said film support means for focusing said image at a point remote therefrom;
   (c) channel means comprising a reference surface positioned in close spaced relations to one surface of said film to form between said information area and said reference surface a variable width channel having a narrowed throat portion; and
   (d) means for directing a stream of fluid through said channel, the pressure of said stream varying as a function of the spacing between said surfaces;
automatic focusing structure comprising:
   (e) an airtight chamber;
   (f) means for pneumatically interconnecting said chamber with the throat portion of said channel to equalize the pressure therebetween; and
   (g) resilient means interconnecting said film support means and said chamber and responsive to the pressure within said chamber for maintaining a predetermined spaced relation between said film and said reference surface, thereby maintaining image focus at said remote point.

2. The apparatus according to claim 1 wherein said reference surface is cylindrical upon an axis parallel to said film surface to form the narrowed throat portion of said channel along an entire transverse centerline dimension of said information area.

3. The apparatus according to claim 1 wherein said chamber includes an aperture and said resilient means comprises compressible gasket means in peripheral relation to said aperture, whereby, when film is received in the projector, the film forms an airtight closure for said chamber aperture.

4. The apparatus according to claim 3 wherein the throat portion of the channel is aligned with the central portion of said information area, the portion of the channel aligned with said non-information area being wider, whereby the pressure exerted against the channel-side surface of the non-information area is greater than the pressure in said chamber so that the non-information area of the film is held pneumatically against said gasket means.

5. In apparatus for receiving a photographic slide having an information area and a peripheral mounting area and for projecting an image of said information area, the improvement comprising:
   (a) resilient means including a compressible gasket for supporting the slide by peripheral contact with at least one surface of said mounting area;
   (b) channel means including a reference surface in close spaced relation to one surface of the slide to form between said reference surface and said information area a channel of predetermined variable width having a narrowed throat portion;
   (c) means for directing a stream of fluid through said channel, the pressure of said stream varying as a function of the spacing between said surfaces;
   (d) an airtight chamber closed in part by the resiliently supported slide; and
   (e) means for pneumatically interconnecting said chamber with the throat portion of said channel to equalize the pressure therebetween;
   (f) whereby, when the information area of the film alters its position relative to the reference surface, changes in stream pressure resulting from the alteration in the width of the channel throat are reflected in the chamber to move the resiliently supported slide for restoring substantially said predetermined channel width.

6. The apparatus according to claim 5 wherein the throat portion of the channel is aligned with the central portion of said information area, the portion of the channel aligned with said mounting area being wider, whereby the pressure exerted against the channel-side surface of the mounting area is greater than the pressure in said chamber so that the mounting area of the slide is held pneumatically against said resilient means.

References Cited

UNITED STATES PATENTS

| | | | |
|---|---|---|---|
| 3,260,153 | 7/1966 | Abbott | 88—24 |
| 3,273,953 | 9/1966 | Davee | 88—24 |
| 3,326,081 | 6/1967 | White | 88—24 |

FOREIGN PATENTS 1,348,528  12/1963  France.

NORTON ANSHER, *Primary Examiner.*

C. B. FUNK, *Assistant Examiner.*